US007097913B2

(12) United States Patent
Yuzawa et al.

(10) Patent No.: US 7,097,913 B2
(45) Date of Patent: Aug. 29, 2006

(54) DECORATIVE ARTICLE HAVING TRANSLUCENT WOOD VENEER

(75) Inventors: Satoshi Yuzawa, Shizuoka-ken (JP); Shigeto Imai, Shizuoka-ken (JP); Yoshiaki Sano, Shizuoka-ken (JP)

(73) Assignee: Kabushiki Kaisha Kawai Gakki Seisakusho, Hamamatsu (JP)

( * ) Notice: Subject to any disclaimer, the term of this patent is extended or adjusted under 35 U.S.C. 154(b) by 527 days.

(21) Appl. No.: 09/862,997

(22) Filed: May 23, 2001

(65) Prior Publication Data

US 2002/0031620 A1 Mar. 14, 2002

(30) Foreign Application Priority Data

| May 24, 2000 | (JP) | ............................. 2000-152411 |
| May 30, 2000 | (JP) | ............................. 2000-160998 |
| May 31, 2000 | (JP) | ............................. 2000-162643 |
| Jun. 8, 2000 | (JP) | ............................. 2000-171843 |
| Apr. 16, 2001 | (JP) | ............................. 2001-117243 |
| Apr. 19, 2001 | (JP) | ............................. 2001-120912 |
| Apr. 27, 2001 | (JP) | ............................. 2001-133144 |

(51) Int. Cl.
*B32B 21/08* (2006.01)
*F21V 11/16* (2006.01)

(52) U.S. Cl. .................. 428/537.1; 428/106; 362/351; 362/355

(58) Field of Classification Search ................ 362/565, 362/311, 355, 8, 555, 582, 217, 216, 246, 362/251, 800, 231, 223, 240, 184, 489, 562, 362/545, 605, 561, 316, 602, 606, 551, 558, 362/559, 351, 134, 127, 600; 349/61, 62; 428/44, 58, 148, 1.1, 57.1, 18, 13, 151, 106, 428/913.3, 425.1, 479.6, 98, 481, 105, 411.1, 428/412, 423.1, 455, 474.4, 480, 479.3, 540, 428/541, 537.1, 10
See application file for complete search history.

(56) References Cited

U.S. PATENT DOCUMENTS 2,829,081 A * 4/1958 Sweem ........................ 156/300

(Continued)

FOREIGN PATENT DOCUMENTS

JP 3-30922 * 2/1991

*Primary Examiner*—Sandra O'Shea
*Assistant Examiner*—Ismael Negron
(74) *Attorney, Agent, or Firm*—Crowell & Moring LLP

(57) ABSTRACT

A wood-based decorative article has a finish with grain enhanced by coloring or dyeing. A coated veneer sheet of sliced wood is prepared by bonding a reinforcing member onto the coated veneer by an adhesive. Injection molding is carried out by injecting a molten synthetic resin onto a rear surface of the prepared veneer sheet, thereby integrating the veneer sheet and the synthetic resin with each other and at the same time molding the wood-based decorative article.

11 Claims, 9 Drawing Sheets

U.S. PATENT DOCUMENTS

| | | | |
|---|---|---|---|
| 3,271,568 A * | 9/1966 | Lundberg | 40/545 |
| 4,974,122 A * | 11/1990 | Shaw | 362/31 |
| 5,050,946 A * | 9/1991 | Hathaway et al. | 385/33 |
| 5,194,310 A * | 3/1993 | Lenderink | 428/187 |
| 5,251,392 A * | 10/1993 | McManigal | 40/427 |
| 5,253,051 A * | 10/1993 | McManigal | 348/121 |
| 5,264,062 A * | 11/1993 | Ohsumi et al. | 156/228 |
| 5,338,592 A * | 8/1994 | Ohsumi et al. | 428/106 |
| 5,375,043 A * | 12/1994 | Tokunaga | 362/31 |
| 5,426,879 A * | 6/1995 | Hecker | 40/427 |
| 5,617,251 A * | 4/1997 | Ohta et al. | 362/31 |
| 5,989,657 A * | 11/1999 | Wurz et al. | 428/31 |
| 6,025,064 A * | 2/2000 | Kawata et al. | 428/304.4 |
| 6,129,985 A * | 10/2000 | Ohsumi et al. | 428/412 |
| 6,156,411 A * | 12/2000 | Jennings | 428/195 |
| 6,220,741 B1 * | 4/2001 | Kawachi et al. | 362/561 |
| 6,439,731 B1 * | 8/2002 | Johnson et al. | 362/29 |

* cited by examiner

FIG. 1
PRIOR ART
(a) 
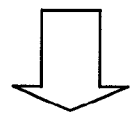
(b) 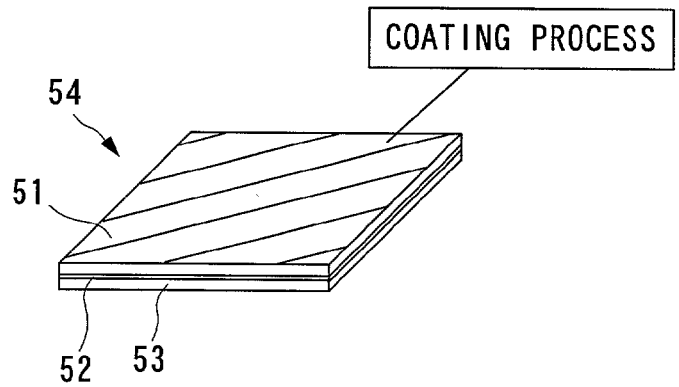
(c) 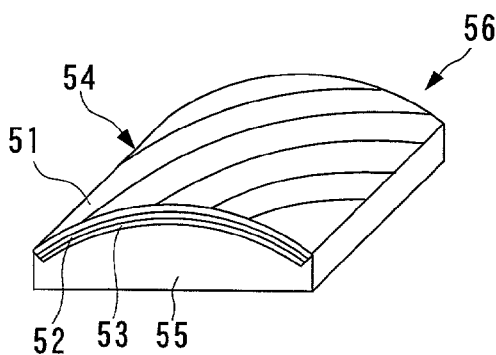

FIG. 2
PRIOR ART
(a)
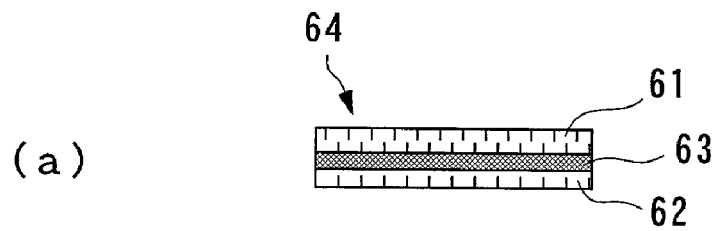
INJECTION MOLDING
(b)
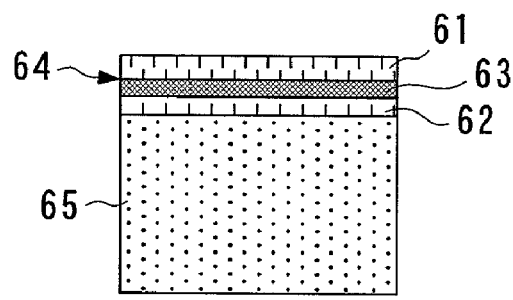
COATING
(c)
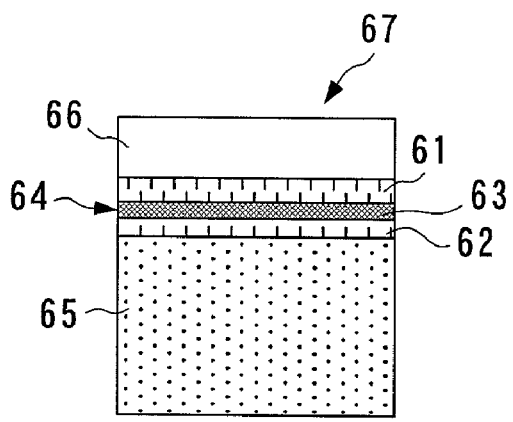

F I G. 4
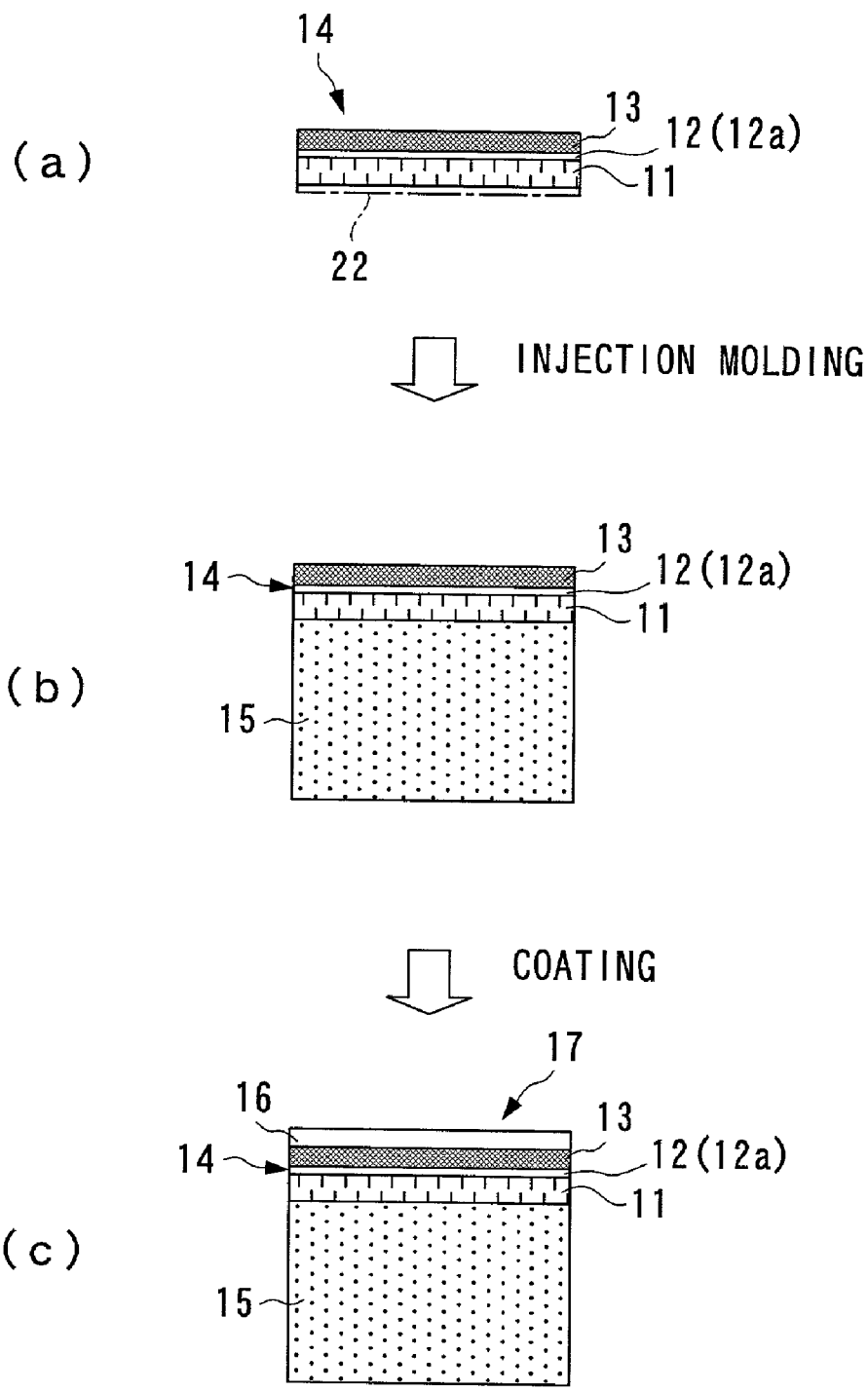

DECORATIVE ARTICLE HAVING TRANSLUCENT WOOD VENEER

BACKGROUND OF THE INVENTION

1. Field of the Invention

This invention relates to a wood-based decorative article of composite construction having a veneer arranged on the front surface side thereof and a synthetic resin arranged on the rear surface side thereof and used for decoration of interior equipment for automotive vehicles, furniture, household electrical appliances, and so forth, as well as to a method of manufacturing the same.

2. Description of the Prior Art

Conventionally, a method of manufacturing a wood-based decorative article of the above-mentioned kind was disclosed e.g. in Japanese Patent Publication (Kokoku) No. 1995-115380. As shown in FIG. 1, according to the manufacturing method, first, a veneer 51 formed of thinly sliced wood is made available (FIG. 1(a)), and then a reinforcing member 53 formed e.g. of a thin metal plate is bonded to the rear surface of the veneer 51 by an adhesive 52 to thereby produce a veneer sheet 54, and a coating process including coloring or dyeing and top coating is performed on the veneer 51 of the veneer sheet 54 (FIG. 1(b)). The coloring/dyeing of the veneer 51 is performed so as to achieve a more beautiful finish by enhancing the grain of the veneer 51. Then, the veneer sheet 54 is set in a mold, not shown, and a molten synthetic resin is injected onto the rear surface of the veneer sheet 54, whereby a substrate 55 made of the synthetic resin is formed on the rear surface of the veneer sheet 54 in a manner integrated with the veneer sheet 54, and at the same time a wood-based decorative article 56 is obtained which is molded as a whole to have a predetermined shape (FIG. 1(c)).

The other conventional methods of manufacturing a wood-based decorative article include, for instance, one illustrated in FIG. 2. According to this manufacturing method, first, two front and rear veneers 61, 62 each formed of thinly sliced wood and a non-woven fabric 63 interposed therebetween are laid one upon another and bonded to each other by using an adhesive, not shown, to make a veneer sheet 64 (FIG. 2(a)). The front veneer 61 functions as a decorative layer, and the non-woven fabric 63 as a reinforcing layer for reinforcing the front veneer 61 which is fragile. Further, the rear veneer 62 functions as an anchoring layer for anchoring a synthetic resin injected onto the rear surface thereof at the following step. Then, after setting the veneer sheet 64 in a mold, not shown, the molten synthetic resin is injected onto the rear surface of the veneer sheet 64 and molded to form a substrate 65 on the rear surface of the veneer sheet 64 in a manner integrated with the veneer sheet 64 (FIG. 2(b)). The substrate 65 is provided for ensuring the strength and rigidity of the wood-based decorative article 67, and the synthetic resin forming the substrate 65 is opaque. Then, top coating is performed on the front surface of the veneer sheet 64, i.e. on the front veneer 61 to form a topcoat layer 66, thereby completing the wood-based decorative article 67 (FIG. 2(c)). The topcoat layer 66 is usually given a polished finish by applying a thick coat e.g. of a polyester coating material onto the front veneer 61 through overcoating performed by multiple coating processes, including an undercoating process, an intercoating process and a finish coating process, while repeatedly carrying out polishing processes for polishing films formed by the respective coating processes.

However, in the conventional manufacturing method shown in FIG. 1, the reinforcing member 53 is bonded to the veneer 51 by the adhesive 52, and then subjected to coating such as coloring or dyeing. Therefore, before the coloring or dyeing is carried out, the veneer 51 has its vessels and fibers impregnated with the adhesive 52. As a result, a coloring agent or a dye is hindered by the adhesive 52 from sufficiently penetrating into the vessels and fibers of the veneer 51, which makes it impossible to carry out sufficient coloring or dyeing to obtain a beautiful wood grain.

Further, the wood-based decorative article 56 is a composite of the veneer 51 and the substrate 55 having different physical properties, and hence tends to suffer from the following problem: The expansion factor of the veneer 51 in relation to humidity is larger than that of the synthetic resin forming the substrate, and hence the dimensional change of the veneer 51 due to a change in humidity is larger. However, since the veneer 51 and the substrate 55 are integrally joined to each other, the veneer 51 is restrained from the dimensional change. For this reason, when the wood-based decorative article 56 is placed in a highly humid environment, a compressive stress acts on the veneer 51, while a tensile stress acts on the substrate 55, which can cause cracking or warpage of the veneer 51.

On the other hand, in the conventional manufacturing method illustrated in FIG. 2, in order to achieve a polished finish, it is required to form the thick topcoat layer 66 through overcoating by repeatedly carrying out the application of the top coating material and polishing of the same. Therefore, the number of man-hours required for the top coating process and the material cost are increased, which leads to increased manufacturing costs. Further, since it is required to provide not only the front veneer 61 but also the rear veneer 62 as the anchoring layer for anchoring the injected synthetic resin, the number of man-hours required to make the veneer sheet is further increased, and the use of the two relatively expensive veneers causes an increase in the material cost, which also leads to the increased manufacturing costs.

Moreover, while the front surface is subjected to the top coating process to be given a polished finish, it is only the front veneer 61 arranged with the substrate 65 as its background that can be seen through the topcoat layer 66. For this reason, the front veneer 61 lacks the feel of depth and the feel of gloss (shiny brightness which looks different depending on viewing angles), and hence only a monotonous finish can be obtained. For the same reason, the design of the wood-based decorative article 67 is substantially determined by the front veneer 61, so that as long as the front veneer 61 remains unchanged, the design of the wood-based decorative article 67 is basically unchanged to provide only a substantially fixed design.

SUMMARY OF THE INVENTION

It is a first object of the invention to provide a method of manufacturing a wood-based decorative article, which can fully ensure the effect of coating a veneer e.g. for achieving a beautiful finish with an enhanced grain of the veneer by coloring or dyeing.

It is a second object of the invention to provide a method of manufacturing a wood-based decorative article, which makes it possible to sharply reduce manufacturing costs of thereof while maintaining the quality of the same, through reduction of the number of veneers used and simplification of a top coating process.

It is a third object of the invention to provide a wood-based decorative article which can have a unique and beautiful finish enhancing the feel of depth and the feel of gloss and realize diverse designs and functions.

The above first object is attained by a method of manufacturing a wood-based decorative article, comprising the steps of performing a predetermined coating process on a veneer formed by slicing wood, preparing a veneer sheet by bonding a reinforcing member to the coated veneer by an adhesive, and carrying out injection molding by injecting a molten synthetic resin onto a rear surface of the prepared veneer sheet, to thereby integrate the veneer sheet and the synthetic resin with each other.

According to this method of manufacturing a wood-based decorative article, first, the predetermined coating process is performed on the veneer, then the veneer sheet is prepared by bonding the reinforcing member onto the coated veneer by the adhesive, and then, the prepared veneer is subjected to injection molding with the synthetic resin to thereby produce the wood-based decorative article. As described above, in the manufacturing method of the invention, the veneer is subjected to the predetermined coating process before the reinforcing member is bonded to the veneer, so that differently from the prior art, it is possible to fully perform the coating process without being hindered by the adhesive, thereby fully ensuring the effect of the coating. The "predetermined coating process" for the veneer in this case is typically coloring or dyeing, for instance, and when the coloring or dyeing is performed on the veneer, a coloring agent or a dye is allowed to penetrate fully into the vessels and fibers of the veneer, whereby a beautiful finish with an enhanced grain of the veneer can be achieved.

In this case, it is preferred that a colored adhesive is used as the adhesive.

According to this method, the colored adhesive used for bonding the reinforcing member penetrates into the veneer, whereby the grain of the veneer is further enhanced, and the tone and depth of the color of the veneer can be varied according to the color of the colored adhesive.

Alternatively, it is preferred that a dimensional stabilization process by using a dimensional stabilizer is performed on the veneer subjected to the predetermined coating process, before preparing the veneer sheet.

According to this method, the dimensional stabilization process by the dimensional stabilizer is performed on the veneer subjected to the predetermined coating process, whereby it is possible to control swelling and shrinking of the veneer due to a change in humidity, and thereby enhance dimensional stability of the veneer, which prevents cracking and warpage of the same.

Further in this case, it is preferred that the dimensional stabilizer is colored by a coloring agent.

According to this method, the color of the dimensional stabilizer is superimposed upon the color of the veneer subjected to the predetermined coating process, whereby the tone and depth of the color of the veneer can be varied according to the color of the dimensional stabilizer.

Alternatively, it is preferred that one of a coating process and an impregnation process is performed on the prepared veneer sheet before the injection molding.

According to this method, the prepared veneer sheet is further subjected to coating or impregnation before the injection molding, when the prepared veneer is in a flat sheet state. This permits the coating or impregnation process to be carried out more easily than when the process is performed on the veneer sheet formed to have a three-dimensional shape. Further, the above coating or impregnation process may be executed by carrying out the coating of the veneer sheet e.g. with a clear coating material or impregnation of the same e.g. with a clear resin, as an undercoating or intercoating process of the top coating, whereby it is possible to simplify the finishing process. As a result, the wood-based decorative article can be produced efficiently, which contributes to reduction of manufacturing costs. It should be noted that the "predetermined coating process" was already performed on the front surface of the veneer, and hence the coating or impregnation as the undercoating or intercoating on the veneer sheet is performed in a manner overcoating the front surface of the veneer. Therefore, the coating or impregnation process can be performed smoothly without being adversely infected by the adhesive.

Alternatively, it is preferred that top coating is performed on a front surface of the veneer after the injection molding.

According to this method, by performing the top coating on the front surface of the veneer, it is possible to enhance smoothness of the front surface of the wood-based decorative article, thereby achieving a more beautiful finish of the same. Further, through protection of the surface of the wood-based decorative article, durability of the article can also be enhanced.

The above second object of the invention is attained by a method of manufacturing a wood-based decorative article, comprising a veneer sheet-preparing step of preparing a veneer sheet by bonding a fibrous sheet having transparent and air permeable properties onto a front surface of a veneer by using one of an adhesive having a transparent property and a coating material having transparent and adhesive properties, and a substrate-joining step of joining a substrate to a rear surface of the veneer sheet.

According to this method of manufacturing a wood-based decorative article, first, the veneer sheet is prepared by bonding the fibrous sheet having the transparent and air permeable properties onto the front surface of the veneer by using the adhesive having the transparent property or the coating material having the transparent and adhesive properties, and then the substrate is joined to the rear surface of the veneer sheet. In the wood-based decorative article, since the fibrous sheet provided on the front surface of the veneer and the adhesive or the coating material used for bonding the fibrous sheet onto the veneer each have the transparent property, the grain of the veneer can be seen through them, which ensures the function of the veneer as a decorative layer. Conversely, the "transparent property" of the adhesive or the coating material and that of the fibrous sheet are only required to allow the veneer to be seen through the adhesive or the coating material and the fibrous sheet to such a degree that the function of the veneer is preserved, and therefore adhesives, coating materials and fibrous sheets for this wood-based decorative article includes translucent ones and colored ones. Further, since the fibrous sheet with the air permeable property allows air existing between the fibrous sheet and the veneer bonded thereto to escape, it is possible to prevent bubbles from being formed within the veneer sheet.

Further, in addition to having the function of reinforcing the veneer similarly to the non-woven fabric in the prior art, the fibrous sheet arranged on the front surface of the veneer also functions as an intermediate coat film during the top coating process. This makes it possible to achieve a polished finish e.g. by only a single operation of finish coating and an operation of polishing, thereby contributing to considerable reduction of the number of man-hours required for the top coating process as well as reduction of the amount of a top coating material used. Thus, the manufacturing costs of the wood-based decorative article can be reduced. Further, since the fibrous sheet has functions of covering the front surface of the veneer sheet and protecting the same, it is even possible to omit the whole top coating process e.g. when specifications do not require polishing.

Further, besides the decorative function, the veneer also functions as an anchoring layer when the substrate is integrally joined thereto by molding the synthetic resin as the veneer is arranged on the rear side of the veneer sheet. This makes it possible to dispense with the rear veneer used in the prior art. As a result, it is possible not only to reduce the amount of expensive veneers used, but also to simplify the construction of the veneer sheet, thereby reducing the number of man-hours required for production of the veneer sheet, which contributes to further reduction of the manufacturing costs.

In this case, it is preferred that the substrate-joining step includes a molding step of introducing a molten synthetic resin onto the rear surface of the veneer sheet to mold the synthetic resin into a predetermine shape and at the same time joining the synthetic resin to the rear surface of the veneer sheet, as the substrate.

According to this method, by introducing the molten synthetic resin onto the rear surface of the veneer sheet and molding the synthetic resin, it is possible to join the synthetic resin to the rear surface of the veneer sheet as the substrate and at the same time mold the synthetic resin into the predetermine shape. In this case, as described above, the veneer functions as the anchoring layer for anchoring the substrate to thereby ensure sufficient adhesion between the veneer sheet and the substrate. It should be noted that the term "molding" used here implies not only injection molding but also vacuum molding, compression molding, and the like.

Further in this case, it is preferred that a hot melt adhesive is provided on the rear surface of the veneer sheet in advance before the molding step.

According to this method, during the molding, the hot melt adhesive provided on the rear surface of the veneer sheet in advance is melted by heat from the molten synthetic resin and then solidifies while mixing with the synthetic resin to thereby bond the same onto the veneer sheet. Thus, the adhesion of the hot melt adhesive is added to that of the anchored synthetic resin, whereby the sufficient adhesion between the veneer sheet and the substrate can be ensured.

Alternatively, it is preferred that a rear fibrous sheet is further bonded to the rear surface of the veneer sheet at the veneer sheet-preparing step.

According to this method, the veneer sheet is produced as a double lined veneer sheet formed by bonding a fibrous sheet and the rear fibrous sheet onto the respective front and rear surfaces of the veneer. Since the veneer has the fibrous sheets bonded to the respective front and rear surfaces thereof, it is possible to prevent occurrence of warpage of the veneer sheet e.g. due to a difference in shrinkage between the veneer and the fibrous sheet. As a result, the veneer sheet can be set in the mold for use in injection molding in a state of being held as flat as possible, so that it is possible to obtain an advantage of a improved yield of the article.

In this case, it is preferred that the substrate-joining step includes a molding step of introducing a molten synthetic resin onto the rear surface of the veneer sheet to mold the synthetic resin into a predetermine shape and at the same time joining the synthetic resin to the rear surface of the veneer sheet, as the substrate.

According to this method, it is possible to join the synthetic resin to the rear surface of the veneer sheet as the substrate simultaneously with the molding of the wood-based decorative article.

Further in this case, it is preferred that a hot melt adhesive is provided on the rear surface of the veneer sheet in advance before the molding step.

According to this method, since the adhesion of the hot melt adhesive is added to that of the anchored synthetic resin, it is possible to ensure sufficient adhesion between the veneer sheet and the substrate. This action is particularly effective when the anchoring force of the rear fibrous sheet is small.

Alternatively, it is preferred that top coating is performed on a front surface of the veneer sheet.

According to this method, by performing the top coating, it is possible to obtain desired functions of top coating, such as polishing and protection of the front surface of the wood-based decorative article. In this case, as described hereinbefore, the fibrous sheet on the front surface functions as the intermediate coat film of the top coating, so that it is possible to achieve a polished finish only by finish coating and polishing, thereby considerably reducing the number of man-hours required for the top coating process.

Alternatively, it is preferred that the veneer is colored before the veneer sheet-preparing step.

According to this method, by coloring the veneer by a dye or a pigment in advance, it is possible to vary the shade and depth of the color of the veneer.

Alternatively, it is preferred that at least one of the fibrous sheet and the adhesive or the coating material is colored in advance in a state of the transparent property thereof being preserved.

As described hereinabove, in the wood-based decorative article manufactured by the manufacturing method of the invention, the fibrous sheet and the adhesive or the coating material on the front surface of the veneer each have a transparent property, so that by coloring at least one of the two in advance to an extent that the transparent property is not spoiled, it is possible to vary the shade and depth of the color of the wood-based decorative article while preserving the state of the veneer being seen through the fibrous sheet and the adhesive or the coating material. Thus, this coloring employed, e.g. in combination with the coloring of the veneer makes it possible to diversify variation in the shade of color and the like of the wood-based decorative article.

The above third object of the invention is attained by a wood-based decorative article comprising a veneer formed by slicing wood, and a substrate formed of a transparent synthetic resin and joined to a rear surface of the veneer.

In general, a veneer formed of sliced wood has a light permeable property (transparent property). Therefore, according to this wood-based decorative article, since the substrate formed of the transparent synthetic resin is arranged on the rear surface side of the veneer having a transparent property, light is allowed to pass through not only the veneer but also the substrate on the rear surface side of the veneer. Consequently, differently from the conventional wood-based decorative article, the present wood-based decorative article can have a unique and beautiful finish enhancing the feel of depth and the feel of gloss of the veneer.

In this case, it is preferred that a transparent reinforcing member for reinforcing the veneer is interposed between the veneer and the substrate. According to this construction, since the veneer is reinforced by the reinforcing member formed e.g. of a non-woven fabric, it is possible to prevent cracking of the veneer, thereby enhancing workability. Further, since the reinforcing member is transparent, the effects described hereinabove are preserved.

Further in this case, it is preferred that at least one of the veneer and the reinforcing member is impregnated with a transparent synthetic resin. According to this construction, since the transparent synthetic resin impregnating the veneer and/or the reinforcing member increases transparency thereof, the feel of depth of the veneer is further enhanced.

Alternatively, it is preferred that a design layer for increasing variation of a design of the veneer is arranged on at least one of front and rear surfaces of the substrate.

According to this construction, when the design layer is arranged on the rear surface of the substrate, for example, the design layer is seen through the transparent substrate in a manner superimposed upon the veneer, which can increase variation of the design of the veneer. In this case, the design layer may be formed by any kind which can vary the design of the veneer, and hence includes a wide range of design layers, such as colored ones, ones with letters, and ones with two or more of these designs, to say nothing of ones with a pattern such as a wood grain pattern.

Further in this case, it is preferred that the design layer is removably attached to the rear surface of the substrate. According to this construction, by replacing one design layer with another as desired, it is possible to vary the pattern or the color tone of the veneer with ease.

Alternatively, it is preferred that a light source for illumination is provided on a rear surface side of the substrate. According to this construction, light from the light source via the substrate illuminates the veneer via the substrate, and a design layer as well if the design layer is provided, whereby it is possible to cause the design of the veneer to emerge even in a dark place.

Further in this case, it is preferred that at least one of a color and an amount of light emitted from the light source is variable. According to this construction, the color tone and brightness of the veneer can be varied by changing the color of light from the light source and/or the amount of the light.

Further, it is preferred that a light guide plate for making uniform the light from the light source is interposed between the light source and the substrate. This construction makes uniform the light from the light source uniform, whereby a natural and mild appearance of the veneer can be obtained.

Further, it is preferred that a display member for displaying predetermined information is provided on a front surface of the veneer. According to this construction, since the display member is also illuminated from the rear side thereof by the light source, the information displayed on the display member can be recognized even in a dark place.

Alternatively, it is preferred that an indicator for giving a predetermined indication by using at least one of a liquid crystal device and an LED device is provided on a rear surface side of the substrate. According to this construction, it is possible to light the liquid crystal device or the LED device only when needed, to thereby project the predetermined information on the front surface of the veneer via the substrate.

Alternatively, it is preferred part of the substrate is formed of an opaque synthetic resin. According to this construction, since the transparent synthetic resin forms only part of the substrate, it is possible to partially highlight the design of the veneer or vary the same within an identical plane, whereby the variation of the design can be further increased.

Alternatively, it is preferred that a top coat is applied to a front surface of the veneer.

BRIEF DESCRIPTION OF THE DRAWINGS

FIG. 2 illustrates another conventional method of manufacturing a wood-based decorative article;

FIG. 4 illustrates a method of manufacturing a wood-based decorative article, according to a second embodiment of the invention;

FIG. 12 illustrates a method of manufacturing a wood-based decorative article, according to a sixth variation of the third embodiment;

FIG. 13 illustrates a method of manufacturing a wood-based decorative article, according to a seventh variation of the third embodiment;

DETAILED DESCRIPTION OF THE PREFERRED EMBODIMENTS

The invention will now be described in detail with reference to the drawings showing preferred embodiments thereof.

Figure 3:
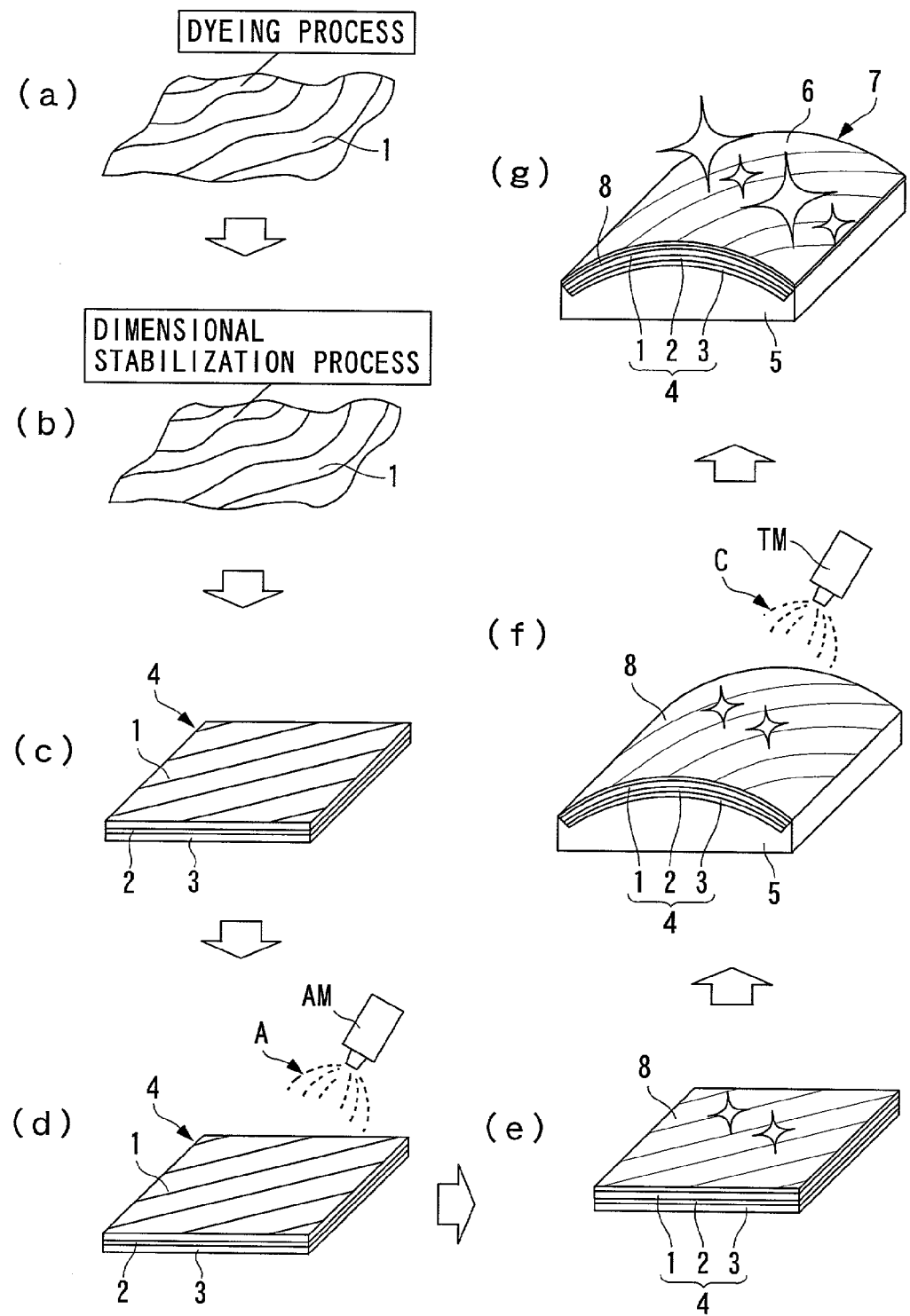
FIG. 3 illustrates a method of manufacturing a wood-based decorative article, according to a first embodiment of the invention.
Figure 1:
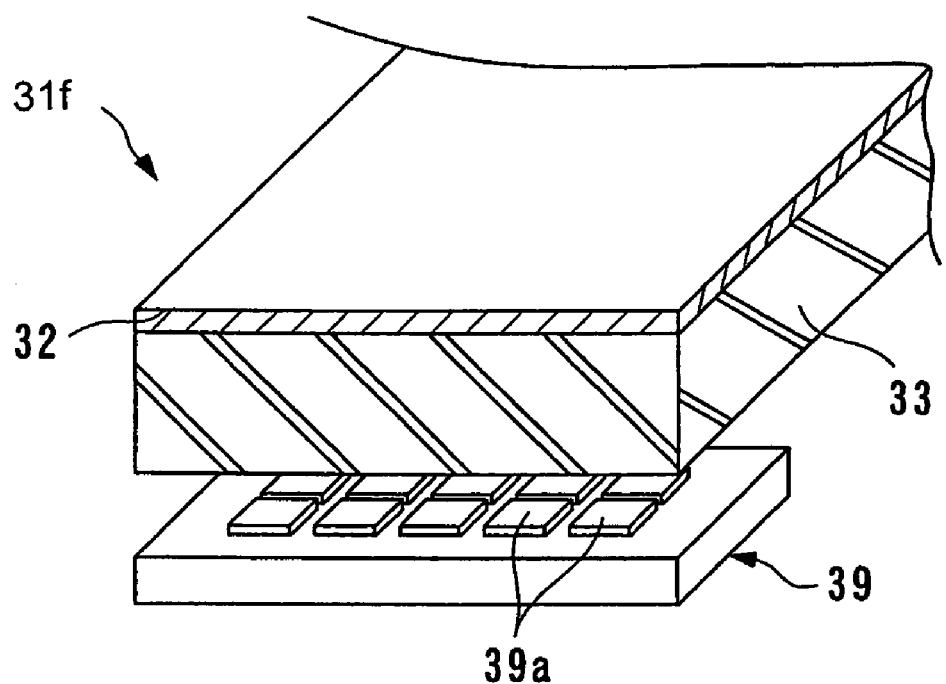
FIG. 1 illustrates a conventional method of manufacturing a wood-based decorative article.
Figure 1:
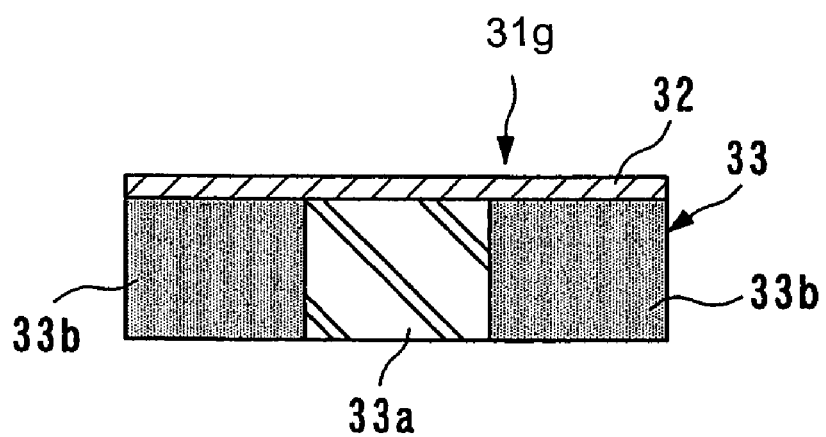

Referring first to FIG. 3, there is illustrated a method of manufacturing a wood-based decorative article according to a first embodiment of the invention. As shown in FIG. 1(g), the wood-based decorative article 7 is comprised of a front veneer sheet 4, and a substrate 5 formed of a synthetic resin integrally formed with the front veneer sheet 4 by injection molding. Further, on the front surface of the front veneer sheet 4, there are formed a clear film layer 8, and a topcoat layer 6.

As shown in FIG. 3(c), the veneer sheet 4 is comprised of a veneer 1, and a reinforcing member 3 bonded to the rear surface of the veneer 1 by an adhesive 2. The veneer 1 is provided for decoration of the wood-based decorative article 7 and is formed by thinly slicing wood, such as walnut or maple, into a sheet having a thickness of approximately 0.2 mm. Further, the veneer 1 is subjected to a dyeing process as a predetermined coating process for enhancing the grain of the veneer 1 as well as to a dimensional stabilization process using a dimensional stabilizer. Polyethylene glycol colored in advance by a coloring agent, for example, is used as the dimensional stabilizer.

The adhesive 2 can be formed of a desired material. Further, the adhesive 2 may be a colorless one or a colored one. In the present embodiment, a colored adhesive is employed.

The reinforcing member 3 not only reinforces the veneer 1 which is fragile, but also functions as an anchoring layer to which the substrate 5 is integrally joined by injection molding. A non-woven fabric or another kind of fibrous material, such as woven fabric or Japanese paper, a veneer, a resin film, or a composite of some of these materials is employed as a material for the reinforcing member 3.

The substrate 5 is provided for imparting strength and rigidity to the wood-based decorative article 7 and formed to have a considerably larger thickness than that of the veneer sheet 4. The substrate 5 is formed of a synthetic resin, such as ABS or polycarbonate, which is suitable for injection molding, and excellent in strength, heat resistance and dimensional stability.

The clear film layer 8 is formed of a clear coating material or the like. The topcoat layer 6 is formed e.g. of a transparent polyester coating material, and serves the function of protecting the front surface of the wood-based decorative article 7. The topcoat layer 6 has such a polished finish that gives a quality appearance to the wood-based decorative article 7.

Next, a method of manufacturing the wood-based decorative article 7 constructed as above will be described with reference to FIG. 3. First, the veneer 1 having the construction described above is prepared or made available, and then a dyeing process is performed on the veneer 1 as a predetermined coating process (FIG. 3(*a*)). In this dyeing process, for example, the veneer 1 is soaked in a solution of a dye of a predetermined color so as to cause the solution to penetrate into the vessels and fibers of the veneer 1, and then the veneer 1 is washed with a predetermined washing liquid, followed by being dried. Thus, the veneer 1 is uniformly colored with the dye.

Then, the veneer 1 is subjected to a dimensional stabilization process (FIG. 3(*b*)). This dimensional stabilization process is performed by brush or spray coating or impregnation using polyethylene glycol. When the impregnation is carried out, an aqueous polyethylene glycol solution may be prepared by dissolving polyethylene glycol in the washing liquid for the dyeing process in advance. This method makes it possible to carry out the impregnation and washing simultaneously and efficiently.

Then, the reinforcing member 3 is bonded to the rear surface of the veneer 1 by the adhesive 2, whereby the veneer sheet 4 is made (FIG. 3(*c*)).

Thereafter, the veneer sheet 4 is subjected to a coating process, wherein a clear coating material A is applied to the veneer sheet 4 by a coating machine AM (FIG. 3(*d*)). As a result, a clear film layer 8 is formed as an undercoat and an intermediate coat for the top coating (FIG. 3(*e*)).

Then, the veneer sheet 4 is set in a mold, not shown, and a molten synthetic resin is injected onto the rear surface of the veneer sheet 4, whereby a substrate 5 is formed on the rear surface of the veneer sheet 4 in a manner integrated with the veneer sheet 4, and at the same time the whole structure is molded or formed into a predetermined shape (FIG. 3(*f*)). Then, a top coating process is carried out by applying a coating material C to the front surface of the veneer 1 by using a coating machine TM (FIG. 3(*f*)). Thus, the topcoat layer 6 is formed, and the wood-based decorative article 7 is completed (FIG. 3(*g*)).

As described above, according to the present embodiment, since the veneer 1 is dyed before the reinforcing member 3 is bonded to the veneer 1 by the adhesive 2, the dye is allowed to penetrate fully into the vessels and fibers of the veneer 1 without being hindered by the adhesive 2 differently from the prior art, which makes it possible to achieve a beautiful finish with an enhanced grain of the veneer 1. Further, the veneer 1 is impregnated with the adhesive 2, whereby the grain of the veneer 1 is still more enhanced, and at the same time, the tone and depth of the color of the veneer 1 can be changed by the color of the adhesive 2. Moreover, application of the topcoat on the front surface of the veneer 1 enhances smoothness of the front surface of the wood-based decorative article 7, thereby achieving a more beautiful finish. Further, since the surface of the wood-based decorative article 7 is protected, durability of the same can be enhanced.

Needless to say, as a predetermined process for coating the veneer 1, it is possible to perform a coloring process using a coloring agent, in place of the dyeing process described above. Also in this case, since the coloring agent is allowed to penetrate fully into the veneer 1 without being hindered by the adhesive 2, it is possible to achieve a beautiful finish with an enhanced grain of the veneer 1.

Further, by being subjected to the dimensional stabilization process, the veneer 1 has the insides of cell walls thereof filled with polyethylene glycol, so that it is held in a swelled state (bulking effect). Consequently, even if compressive stress or tensile stress due to a difference in expansion factor between the veneer 1 and the substrate 5 formed of the synthetic resin is generated in the veneer 1 e.g. in accordance with a change in humidity, the stress within the veneer 1 is accommodated or reduced by the bulking effect. Thus, humidity-dependent swelling or shrinking of the veneer 1 is controlled, and hence the dimensional stability of the veneer 1 is enhanced, which makes it possible to minimize the dimensional difference between the veneer 1 and the substrate 5, thereby preventing cracking and warpage of the veneer 1. Further, since the color of the polyethylene glycol colored by the coloring agent is superimposed upon the color of the veneer 1, it is possible to change the tone and depth of the color of the veneer 1 according to the color of the colored dimensional stabilizer.

Moreover, before carrying out the molding by the mold, the coating as the undercoating and intermediate coating is carried out on the veneer sheet 4 when the veneer 4 is in a flat sheet state, to thereby form the clear film layer 8. Therefore, the top coating process can be performed simply as a finish coating process. This makes it possible to perform the top coating process more easily than in the case of coating the veneer having been formed into a three-dimensional shape, and hence the finishing process can be simplified. As a result, it is possible to produce the wood-based decorative article 7 efficiently, and thereby reduce manufacturing costs.

FIG. 4 illustrates a method of manufacturing a wood-based decorative article, according to a second embodiment of the invention. As shown in FIG. 4(*c*), the wood-based decorative article 17 is comprised of a front veneer sheet 14, and a substrate 15 integrally joined to the rear surface of the front veneer sheet 14. Further, on the front surface of the front veneer sheet 14, there is formed a topcoat layer 16.

As shown in FIG. 4(*a*), the veneer sheet 14 is comprised of a veneer 11, and a non-woven fabric 13 as a fibrous sheet, which is bonded to the rear surface of the veneer 11 by an adhesive 12. Similarly to the veneer 1 in the first embodiment, the veneer 11 is formed of thinly sliced wood, and not only decorates the wood-based decorative article 17 but also functions as an anchoring layer to which the substrate is integrally joined by injection molding, as described hereinafter. The adhesive 12 has a transparent property which allows the veneer 11 to be seen through the adhesive 12. Alternatively, as shown in the figure, a coating material 12a having an adhesive property may be used in place of the adhesive 12 to bond the non-woven fabric 13 onto the veneer 11. The coating material 12a also has a transparent property allowing the veneer 11 to be seen through the material, and for instance, an acrylic resin coating material is used therefor.

The non-woven fabric 13 is formed e.g. of polyester or vinylon. The non-woven fabric 13 is thinly formed to have a thickness of approximately 0.1 mm, and reinforces the veneer 11 which is fragile. Further, the non-woven fabric 13 has an air permeable property as well as a transparent property similar to that of the adhesive 12 or the coating material 12a, which allows the grain pattern of the veneer 11 to be seen through the non-woven fabric 13, thereby ensuring the decorative function of the veneer 11. Moreover, the non-woven fabric 13 functions as an intermediate coat film in carrying out the top coating on the front surface of the veneer sheet 14.

Similarly to the substrate 5 of the first embodiment, the substrate 15 is formed e.g. of ABS or polycarbonate and imparts strength and rigidity to the wood-based decorative article 17.

Also similarly to the topcoat layer 6 of the first embodiment, the topcoat layer 16 is formed e.g. of a transparent polyester coating material.

Next, a method of manufacturing the wood-based decorative article 17 constructed as above will be described with reference to FIG. 4. First, as shown in FIG. 4(a), the non-woven fabric 13 is bonded to the front surface of the veneer 11 by using the adhesive 12 or the coating material 12a, whereby the veneer sheet 14 is made (veneer sheet-preparing step). In the present embodiment, the non-woven fabric 13 has an air permeable property and hence allows air existing between the non-woven fabric 13 and the veneer 11 to escape, thereby preventing bubbles from being formed within the veneer sheet 14.

Then, the produced veneer sheet 14 is set in a mold, not shown, having a predetermined shape, and injection molding is carried out by injecting molten synthetic resin onto the rear surface of the veneer sheet 14, i.e. onto the rear surface of the veneer 11 (molding step). As a result, as shown in FIG. 4(b), the synthetic resin forms the substrate 15 integrally joined to the rear surface of the veneer sheet 14, and at the same time, the veneer sheet 14 and the substrate 15 are integrally formed into a predetermined shape as a unitary member (substrate-joining step). In the present embodiment, the veneer 11 functions as an anchoring layer for anchoring the substrate 15 to thereby ensure sufficient adhesion between the veneer sheet 14 and the substrate 15.

Then, top coating is performed on the front surface of the veneer sheet 14, i.e. on the front surface of the non-woven fabric 13, to form the topcoat layer 16, whereby the wood-based decorative article 17 is completed (FIG. 4(c)). In the present embodiment, the non-woven fabric 13 functions as an intermediate coat film for the top coating.

As described above, according to the above embodiment, the non-woven fabric 13 is not only capable of reinforcing the veneer 11 but also functions as the intermediate coat film in carrying out the top coating process since it is arranged on the front surface side of the veneer 11. This makes it possible to achieve a polished finish which compares favorably with that in the prior art, simply by applying a single finish coat and polishing the same. Consequently, the number of man-hours, as well as the amount of the coating material, required for the top coating process can be considerably reduced, which contributes to sharp reduction of the manufacturing costs of the wood-based decorative article.

Further, the veneer 11 arranged on the rear side of the veneer sheet 14 and having the decorative function also functions as the anchoring layer to which the substrate 15 is integrally joined by injection molding. This makes it possible to dispense with the rear veneer 62 used in the FIG. 2 conventional wood-based decorative article 67. As a result, it is possible not only to reduce the amount of expensive veneers used, but also to simplify the construction of the veneer sheet 14, thereby reducing man-hours required for production of the veneer sheet 14, which contributes to further reduction of the manufacturing costs.

Figure 5:
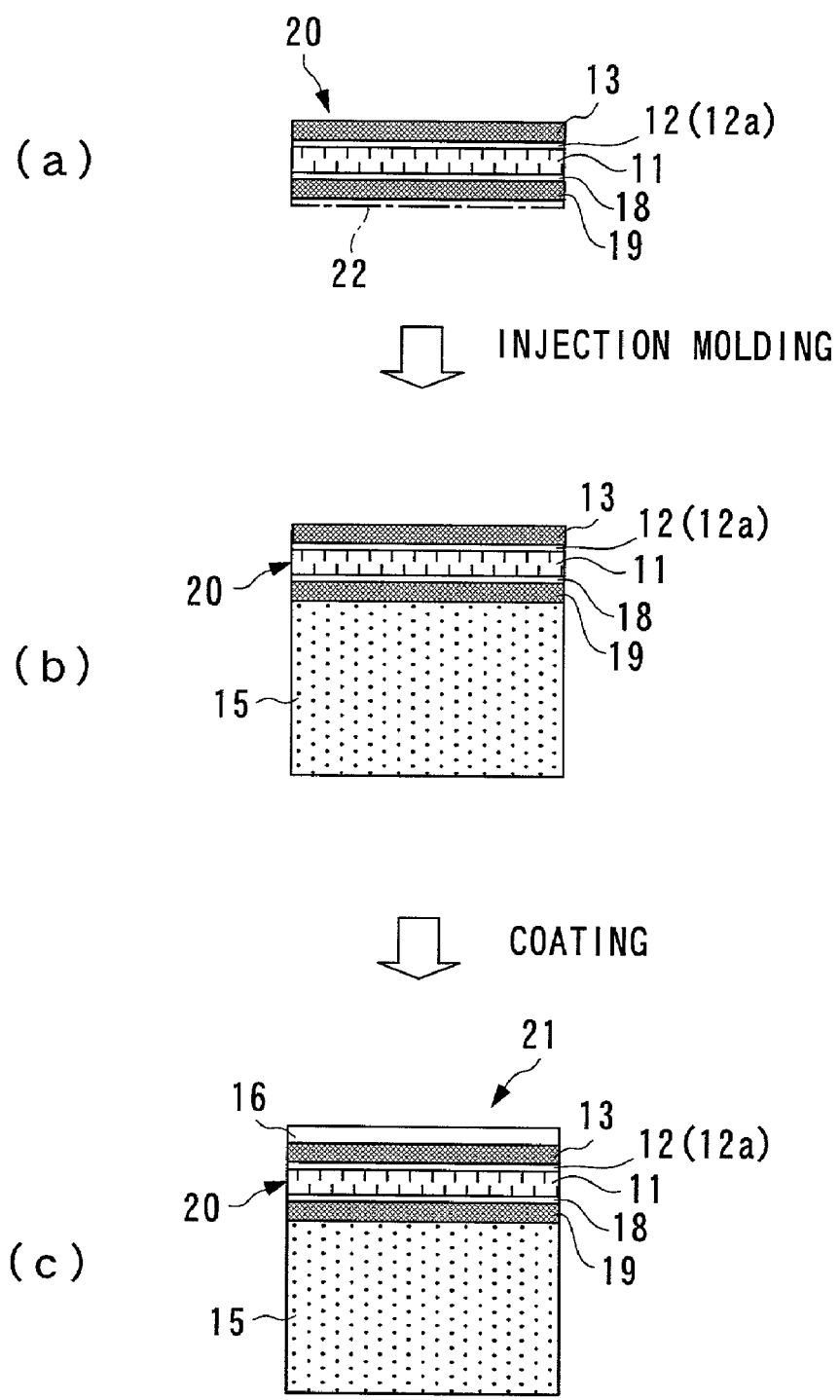
FIG. 5 illustrates a method of manufacturing a wood-based decorative article, according to a variation of the second embodiment.

FIG. 5 illustrates a variation of the second embodiment. In the figure, component parts and elements similar to those in FIG. 4 are designated by identical reference numerals. A wood-based decorative article 21 of this variation is distinguished from the FIG. 4 wood-based decorative article 17 only in that a rear non-woven fabric 19 (rear fibrous sheet) is bonded to the rear surface of a veneer 11 by using an adhesive 18, i.e. that a veneer sheet 20 is produced as a double lined veneer sheet formed by bonding a non-woven fabric 13 and the rear non-woven fabric 19 onto the respective front and rear surfaces of the veneer 11.

A method of manufacturing the wood-based decorative article 21 is basically the same as the method of manufacturing the wood-based decorative article 17. More specifically, the non-woven fabric 13 is bonded to the front surface of the veneer 11 by using an adhesive 12 or a coating material 12a, and the rear non-woven fabric 19 is bonded to the rear surface of the same by using the adhesive 18, whereby the veneer sheet 20 is prepared (FIG. 5(a)). Then, the prepared veneer sheet 20 is set in a mold, not shown, and thereafter injection molding is carried out by injecting a synthetic resin onto the rear surface of the veneer sheet 20, i.e. onto the rear surface of the rear non-woven fabric 19, to form a substrate 15 integrally joined to the rear surface of the veneer sheet 20, while forming or shaping the veneer sheet 20 and the substrate 15 as a unitary member (FIG. 5(b)). Then, a topcoat is applied to the front surface of the veneer sheet 20 to form a topcoat layer 16, whereby the wood-based decorative article 21 is completed (FIG. 5(c)).

Thus, in this variation as well, the non-woven fabric 13 functions as an intermediate coat film for the top coating process, whereby it is possible to reduce the number of man-hours and the amount of coating material used for the top coating process, which contributes to considerable reduction of the manufacturing costs. In addition, in the present variation, since the veneer 11 has the rear non-woven fabric 19 bonded to the rear surface thereof, it is possible to prevent occurrence of warpage of the veneer sheet 20 e.g. due to a difference in the shrinkage factor between the veneer 11 and the non-woven fabric 13. As a result, the veneer sheet 20 can be set in the mold for injection molding in a state of being held as flat as possible, whereby the advantage of an enhanced yield of the article and the like can be obtained. It should be noted that the rear non-woven fabric 19 provided for the above purpose may be formed of an identical material to that of the non-woven fabric 13 or of a different material, e.g. a material having no transparency, so long as the material has a shrinkage factor approximately equal to that of the non-woven fabric 13. This also applies to the adhesive 18.

Although in the above embodiments, the molding or forming of the wood-based decorative article and the joining of the veneer sheet and the substrate are carried out by injection molding, it is possible to employ another suitable method, such as vacuum molding or compression molding. Further, to attain the goal of obtaining the advantage of simplification of the top coating process, the integral joint of the veneer sheet and the substrate may be effected by a method other than molding. For example, the veneer sheet may be simply bonded to the substrate formed of a synthetic resin or another material in advance, by using an adhesive. Moreover, although in the above embodiments, the topcoat is applied onto the front surface of the wood-based decorative article, it is even possible to omit the whole top coating process e.g. when specifications do not require polishing since the non-woven fabric 13 covering the front surface of the wood-based decorative article has a function of protecting the same.

Furthermore, although in the above embodiments, the synthetic resin is injected directly onto the rear surface of the veneer sheet 14, 20 by the injection molding, a hot melt adhesive 22 may be provided on the rear surface of the veneer sheet 14, 20, as shown by one-dot-chain lines in FIGS. 4 and 5, prior to the injection molding. In this case, during the molding, the hot melt adhesive 22 is melted by heat from the molten synthetic resin and mixed with the synthetic resin, and then solidify to bond the synthetic resin onto the veneer sheet 14, 20. Thus, the adhesion of the hot melt adhesive 22 is added to that of the synthetic resin generated by anchoring, which ensures sufficient adhesion between the veneer sheet 14, 20 and the substrate 15. In the above variation, particularly when the anchoring force of the rear non-woven fabric 19 arranged on the veneer sheet 20 is small, it is possible to properly supplement the force by the hot melt adhesive 22.

Further, although in the above embodiments, the non-woven fabric is used as a fibrous sheet, it is possible to employ a fibrous sheet formed of any other suitable material which meets requirements, such as transparency and air permeability. Moreover, in order to increase variation in shade or depth of a color of the wood-based decorative article, the veneer 11 may be colored with a coloring agent, such as a dye or a pigment, before making the veneer sheet 14 or 20. Alternatively, instead of or in combination with the coloring of the veneer 11, at least one of the adhesive 12 and the non-woven fabric 13 may be colored in advance while preserving its transparency. This makes it possible to diversify the shade or depth of the color of the wood-based decorative article.

Figure 6:
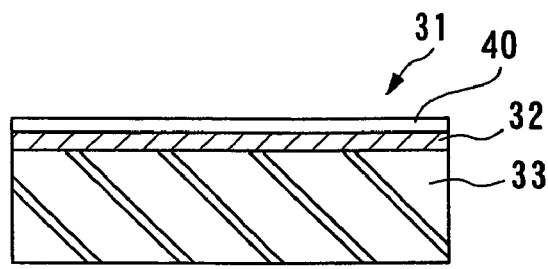
FIG. 6 illustrates a method of manufacturing a wood-based decorative article, according to a third embodiment of the invention.

FIG. 6 shows a wood-based decorative article according to a third embodiment of the invention. The wood-based decorative article 31 is comprised of a front veneer 32, and a substrate 33 integrally joined to the rear surface of the front veneer 32. Further, on the front surface of the veneer 32, there is a topcoat layer 40 formed by the top coating process.

Similarly to the veneers 1, 11 of the first and second embodiments, the veneer 32 is formed by slicing wood into a very thin sheet having a thickness of approximately 0.2 mm, so that the veneer 32 has a certain degree of transparency. Further, the veneer 32 functions as an anchoring layer to which the substrate 33 is joined by injection molding.

The substrate 33 not only ensures the strength and rigidity of the wood-based decorative article 31 but also serves, particularly in the present embodiment, the function of imparting the feel of depth and the feel of gloss to the veneer 32. For this reason, in the present embodiment, the substrate 33 is formed of a synthetic resin, such as polycarbonate or polystyrene, which is suitable for injection molding, and not only excellent in strength, heat resistance and dimensional stability, but also transparent.

The topcoat layer 40 is formed e.g. of a transparent polyester coating material similarly to those of the first and second embodiments.

According to the wood-based decorative article 31 constructed as above, since the substrate 33 formed of the transparent synthetic resin is arranged on the rear surface of the veneer 32 having a transparent property, light is allowed to pass not only through the veneer 32 but also through the substrate 33. As a result, differently from the conventional wood-based decorative article 67 shown in FIG. 2, the wood-based decorative article 31 can have a unique and beautiful finish enhancing the feel of depth and gloss of the veneer 32. As is apparent from the above description, the "transparent property" of the synthetic resin forming the substrate 32 is only required to allow light to pass through the substrate 33 to such an extent as will influence the feel of depth of the veneer 32, and hence the substrate 32 may be a translucent one or a colored one.

FIGS. 7 to 13 show wood-based decorative articles according to first to seventh variations of the present embodiment, respectively. In the following, component parts and elements similar to those in FIG. 6 are designated by identical reference numerals, and description is made by using the reference numerals. Actually, in each of the variations, a topcoat layer 40 similar to that in FIG. 6 is formed on the front surface of a veneer 32, but in FIG. 7 et seq., the respective topcoat layers 40 are not shown for convenience of diagrammatic representation.

Figure 7:
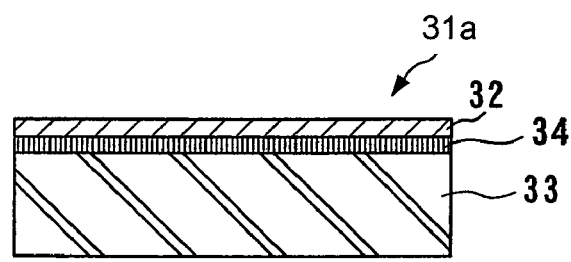
FIG. 7 illustrates a method of manufacturing a wood-based decorative article, according to a first variation of the third embodiment.

The first variation shown in FIG. 7 is characterized in that a transparent reinforcing member 34 is additionally interposed between the veneer 32 and a substrate 33. The reinforcing member 34 is formed of a non-woven fabric which is made of a material having a transparent property, such as polyester or vinylon, and thinly formed to have a thickness of approximately 0.1 mm. Therefore, according to this variation, since the veneer 32 is reinforced by the reinforcing member 34, it is possible to prevent cracking of the veneer 32, thereby improving workability. Further, since the reinforcing member 34 is transparent, the effects obtained by the FIG. 6 embodiment can be maintained. Therefore, also in this variation, the "transparent property" of the synthetic resin forming the reinforcing member 34 is only required to allow at least a certain amount of light to pass through the reinforcing member 34, and hence the reinforcing member 34 may be a translucent one or a colored one.

It should be noted that, although not shown in the figures, the veneer 32 in FIG. 6 or at least one of the veneer 32 and the reinforcing member 34 in the first variation may be impregnated with a transparent synthetic resin in advance. In this method, since the transparency of the veneer 32 and/or that of the reinforcing member 34 are/is increased by the transparent synthetic resin contained therein, it is possible to further enhance the feel of depth of the veneer 32. Also in this case, the "transparent property" of the synthetic resin for the impregnation is only required to allow at least a certain amount of light to pass through the reinforcing member 34 to such an extent as will provide the effect of increasing the transparency of the veneer 32 or the reinforcing member 34, and hence the synthetic resin may be a translucent one or a colored one. Therefore, the synthetic resin is polyester resin or polyurethane resin, for example.

Figure 8:
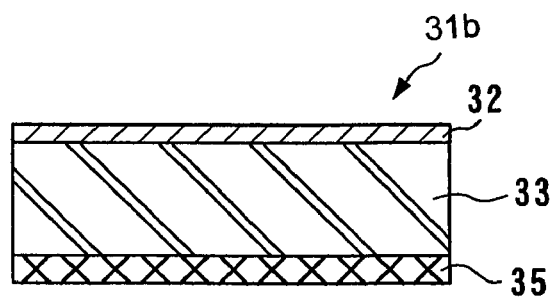
FIG. 8 illustrates a method of manufacturing a wood-based decorative article, according to a second variation of the third embodiment.

The second variation shown in FIG. 8 is characterized in that a design layer 35 is arranged on the rear surface of a substrate 33. The design layer 35 is provided for increasing variation of the design of the veneer 32. The design layer 35 can be formed, as desired, e.g. as one with a pattern such as a wood grain pattern, a colored one, one with characters or letters, or one with two or more of these designs.

Therefore, according to this variation, the design layer 35 is seen through the transparent substrate 33 such that the veneer 32 is superimposed upon the design layer 35, which makes it possible to vary the design of the veneer 32. More specifically, in the case of the design layer 35 being a patterned design layer, it is possible to increase variation of the grain pattern of the veneer 32, whereas in the case of the same being a design layer 35 which is colored, it is possible to change the color tone of the veneer 32 into a different one. Further, in the case of the same being one having characters or letters thereon, it is possible to create a composite design formed by the grain pattern of the veneer 32 and the characters or letters. Thus, it is possible to vary the design of the article even if the veneer 32 remains the same.

Further, the design layer 35 may be removably attached to the rear surface of the substrate 33. This method makes it possible to easily vary the pattern or the color tone of the veneer 32 by replacing one design layer 35 with another, as desired. Alternatively, the design layer 35 may be arranged on the front surface of the substrate 33. In this case, the design layer 35 is seen not via the substrate 33 but directly through the veneer 32, thereby varying the design of the veneer 32, and it is possible to obtain a different design from that obtained when the design layer 35 is arranged on the rear surface of the substrate 33.

Figure 9:
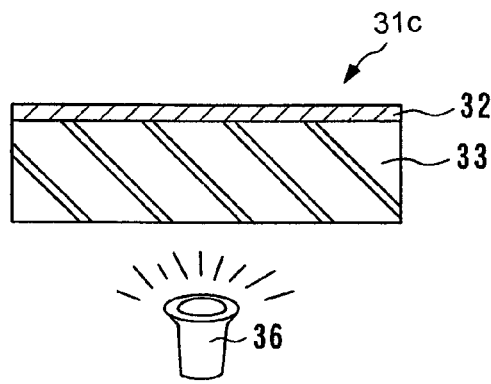
FIG. 9 illustrates a method of manufacturing a wood-based decorative article, according to a third variation of the third embodiment.

The third variation shown in FIG. 9 is characterized in that a light source 36 for illumination is arranged on the rear surface of the substrate 33 of the third embodiment. This light source is turned on/off by an operating element, not shown, such as a switch. According to the present variation, by illuminating the veneer 32 by light from the light source 36 via the substrate 33, it is possible to cause a design of the veneer 32 to emerge even in a dark place.

The light source 36 may be configured such that one or both of the color and the amount of light can be varied, and the color and the amount of light can be adjusted by operating elements. This method makes it possible to change the color and/or the amount of light from the light source 36 to thereby cause a desired change in the color tone and brightness of the veneer 32. Further, although not shown in the drawings, the wood-based decorative article 31b of the second variation may be configured such that it is provided with a light source 36. In this case, by illuminating the design layer 35 together with the veneer 32, it is possible to cause the design of the veneer 32 to emerge in a manner superimposed upon the design layer 35.

Figure 10:
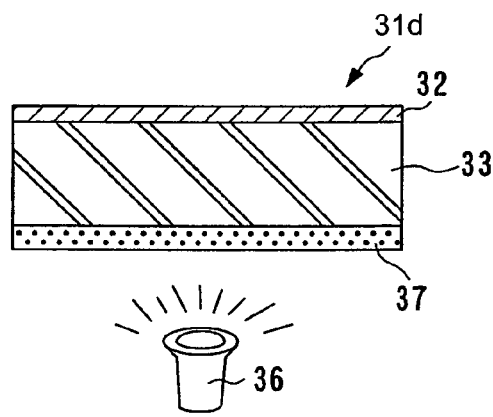
FIG. 10 illustrates a method of manufacturing a wood-based decorative article, according to a fourth variation of the third embodiment.

The fourth variation shown in FIG. 10 is characterized in that a light guide plate 37 is arranged on the rear surface of the substrate 33 of the third variation. The light guide plate 37 allows light from the light source 36 to pass therethrough while diffusing the same, to thereby make the light uniform. The light guide plate 37 is formed e.g. of frosted glass or opaque glass and mounted after the molding or forming of the wood-based decorative article 31d. Therefore, in this variation, the light from the light source 36 is made uniform by its light guide plate 37, whereby a natural and mild appearance of the veneer 32 can be obtained.

Figure 11:
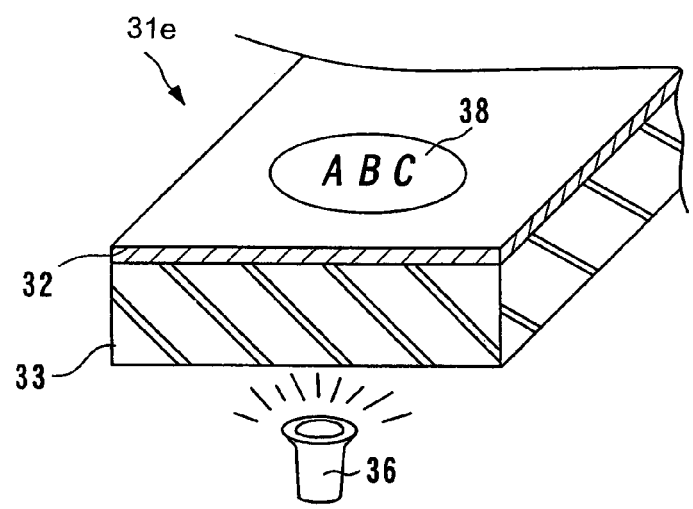
FIG. 11 illustrates a method of manufacturing a wood-based decorative article, according to a fifth variation of the third embodiment.

The fifth variation shown in FIG. 11 is characterized in that a display label 38 (display member) is provided on the front surface of the substrate 33 of the third variation. On the display label 38, there is displayed a character string or the like indicative of predetermined information to be given to the user. The display label 38 is pasted on the front surface of the veneer 32 upon or after the molding or forming of the wood-based decorative article 31e. According to this variation, since the display label 38 is also illuminated from the rear side thereof by the light source 36, the information displayed on the display label 38 can be recognized even in a dark place.

The sixth variation shown in FIG. 12 is characterized in that an indicator 39 is arranged on the rear surface of the substrate 33 of the third variation in place of the light source 36. The indicator 39 includes a plurality of LED's 39a and indicates predetermined information by lighting the LED's 39a. According to this variation, it is possible to light the LED's 39a only when needed, to thereby project the predetermined information on the front surface of the veneer 32 via the substrate 33. It should be noted that liquid crystals may be used as light-emitting elements of the indicator 39 in place of the LED's 39a. In this case, it is possible to obtain the same effect.

The seventh variation shown in FIG. 13 is characterized in that a substrate 33 is formed by a transparent portion 33a formed of a transparent synthetic resin and an opaque portion 33b formed of an opaque synthetic resin. The portions 33a, 33b are integrally formed with each other. In this variation, the transparent portion 33a is arranged through a central portion of the substrate 33 in a front-rear direction, and the whole remaining portion of the substrate 33 is formed as the opaque portion 33b. Therefore, according to the present variation, since the transparent portion 33a is formed only as part of the substrate 33, it is possible to make the design of the veneer 32 conspicuous by partially highlighting the same or vary the same within an identical plane, whereby it is possible to further increase the variation of the design.

Although the wood-based decorative article 31, 31a–31g according to each of the above variations is based on the FIG. 6 construction, with only one or two of the reinforcing member 34, the design layer 35, the light source 36, the light guide plate 37, the display label 38 and the indicator 39 being added thereto as element(s) characterizing the variation, this is not limitative, but it is also possible to put into practice variations constructed by respective combinations of two or more of the component parts 34 to 39 other than the combinations shown above, whereby more diverse designs and display functions can be obtained.

Figure 14:
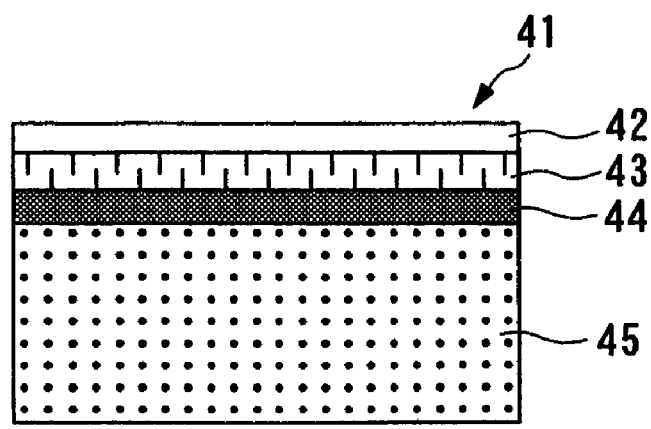
FIG. 14 illustrates a method of manufacturing a wood-based decorative article, according to a fourth embodiment of the invention.

FIG. 14 shows a wood-based decorative article according to a fourth embodiment of the invention. As shown in the figure, the wood-based decorative article 41 is comprised of a front veneer 43, a reinforcing member 44 bonded to the rear surface of the front veneer 43, and a substrate 45 integrally joined to the rear surface of the reinforcing member 44. On the front surface of the veneer 43, there is formed a topcoat layer 42.

The veneer 43 is formed of thinly sliced wood and has a certain degree of transparency. The reinforcing member 44 not only reinforces the veneer 43, but also functions as an anchoring layer to which the substrate 45 is integrally joined by injection molding. In the present embodiment, the reinforcing member 44 is formed by a sheet of thin non-woven fabric formed e.g. of polyester or vinylon and having a thickness of approximately 0.1 mm. The non-woven fabric is colored by a coloring agent of a predetermined color. The substrate 45 is formed e.g. of ABS or polycarbonate. Further, the topcoat layer 2 is formed e.g. of a transparent polyester coating material.

According to the wood-based decorative article 41 of the present embodiment, the reinforcing member 44 arranged on the rear surface of the veneer 43 is colored, and the color of the reinforcing member 44 is seen through very transparent grain pattern portions of the veneer 43, so that contrast between the transparent portions and the other less transparent portions is enhanced, which enables the wood-based decorative article 41 to have a beautiful finish with an enhanced grain of the veneer 43. Further, the wood-based decorative article 41 has the reinforcing member 44 simply colored, which is generally provided for reinforcing a veneer, and therefore, it is possible to obtain the above effect reliably by an extremely simple and low-cost construction without any need to carry out a complicated process for coloring the veneer 43.

Moreover, since transmission of the color of the substrate 45 to the veneer 43 is blocked by the reinforcing member 44, the color of the substrate 45 is prevented from influencing the tone color of the veneer 43. As a result, it is possible to select the color of a synthetic resin for forming the substrate 45, without reference to the color tone of the veneer 43. Further, when coloring including dyeing is performed on the veneer 34 so as to change the color tone of the veneer 43 to a desired one, a color to be used for the coloring can be selected independently of the color of the substrate 45.

Figure 15:
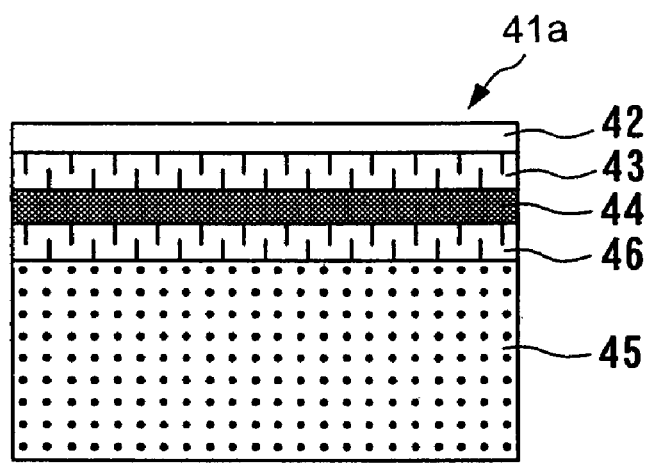
FIG. 15 illustrates a method of manufacturing a wood-based decorative article, according to a variation of the fourth embodiment.

FIG. 15 shows a wood-based decorative article according to a variation of the fourth embodiment. The wood-based decorative article 41a is characterized in that a second reinforcing member 46 is additionally provided on the rear surface of the reinforcing member 44 of the FIG. 14 wood-based decorative article 41. The second reinforcing member 46 is formed e.g. of a wood-based veneer similar to the veneer 43. The second reinforcing member 46 is bonded to the rear surface of the reinforcing member 44.

According to this variation, since the second reinforcing member 46 is additionally provided on the rear surface of the reinforcing member 44, it is possible, for example, to reduce warpage of the veneer 43 occurring before injection molding of the substrate 45, thereby improving workability of the veneer 43. Further, particularly in the present variation, since the second reinforcing member 46 is formed of the wood-based veneer similar to the veneer 43, a more excellent effect of reducing warpage of the veneer 43 can be provided by the second reinforcing member 46. At the same time, it is possible to improve an anchoring effect in integrally joining the substrate 45 to the second reinforcing member 46 by injection molding, thereby enhancing integration between the substrate 45 and the second reinforcing member 46.

Although in the present embodiment, the non-woven fabric colored by the coloring agent is used as the reinforcing member 44, the coloration may be carried out by dyeing, or alternatively, a colored non-woven fabric commercially available may be used. Further, it is not absolutely required that the reinforcing member 44 is formed of a non-woven fabric, but any material capable of reinforcing the veneer 43 and colored enough to enhance the grain of the same can be used as the reinforcing member 44. Therefore, it is possible to employ any selected from a wide range of materials, including fibrous materials, such as woven fabrics and Japanese papers, veneers, and resin films, each of which may be colored e.g. during manufacturing of the wood-based decorative article 41a or in advance, and composites of some of these materials. In any of these cases, it is possible to enhance the grain of the veneer 43 by the reinforcing member 44, thereby obtaining a beautiful finish of the wood-based decorative article 41a.

Further, it is not absolutely required, either, that the second reinforcing member 46 of the variation is formed of the veneer as in the above example, but any one of the various kinds of materials listed above for the reinforcing member 44 can be used as a material for the second reinforcing member 46.

It is further understood by those skilled in the art that the foregoing is a preferred embodiment of the invention, and that various changes and modifications may be made without departing from the spirit and scope thereof.

What is claimed is:

1. A wood-based decorative article comprising:
   a veneer formed by slicing wood and being light permeable;
   a substrate formed of a transparent synthetic resin and joined to a rear surface of said veneer, said substrate having rigidity and a larger thickness than that of said veneer;
   a transparent reinforcing member for reinforcing said veneer interposed between said veneer and said substrate; and
   a transparent adhesive by which the reinforcing member is bonded to the veneer.

2. A wood-based decorative article according to claim 1, wherein at least one of said veneer and said reinforcing member is impregnated with a transparent synthetic resin.

3. A wood-based decorative article according to claim 1, wherein an indicator for giving a predetermined indication by using at least one of a liquid crystal device and an LED device is provided on a rear surface side of said substrate.

4. A wood-based decorative article according to claim 1, wherein part of said substrate is formed of an opaque synthetic resin.

5. A wood-based decorative article according to claim 1, wherein a topcoat is applied to a front surface of said veneer.

6. A wood-based decorative article according to claim 1, wherein a design layer for increasing variation of a design of said veneer is arranged on at least one of front and rear surfaces of said substrate.

7. A wood-based decorative article according to claim 6, wherein said design layer is removably attached to said rear surface of said substrate.

8. A wood-based decorative article according to claim 1, wherein a light source for illumination is provided on a rear surface side of said substrate.

9. A wood-based decorative article according to claim 8, wherein at least one of a color and an amount of light emitted from said light source is variable.

10. A wood-based decorative article according to claim 8, wherein a light guide plate for making uniform said light from said light source is interposed between said light source and said substrate.

11. A wood-based decorative article according to claim 8, wherein a display member for displaying predetermined information is provided on a front surface of said veneer.

* * * * *